(12) United States Patent
Erhard et al.

(10) Patent No.: US 12,695,078 B2
(45) Date of Patent: Jul. 28, 2026

(54) SINGLE-SIDED STANDING WAVE FOR EXCITING TRAPPED IONS

(71) Applicant: Alpine Quantum Technologies GmbH, Innsbruck (AT)

(72) Inventors: Alexander Erhard, Innsbruck (AT); Thomas Feldker, Innsbruck (AT); Georg Jacob, Innsbruck (AT)

(73) Assignee: Alpine Quantum Technologies GmbH, Innsbruck (AT)

( * ) Notice: Subject to any disclaimer, the term of this patent is extended or adjusted under 35 U.S.C. 154(b) by 576 days.

(21) Appl. No.: 18/209,186

(22) Filed: Jun. 13, 2023

(65) Prior Publication Data

US 2023/0420241 A1 Dec. 28, 2023

(30) Foreign Application Priority Data

Jun. 14, 2022 (EP) .................................... 22178978

(51) Int. Cl.
*H01J 49/42* (2006.01)
*G02F 1/29* (2006.01)
(Continued)

(52) U.S. Cl.
CPC .............. *H01J 49/427* (2013.01); *G02F 1/29* (2013.01); *G02F 3/026* (2013.01); *H01J 49/424* (2013.01);
(Continued)

(58) Field of Classification Search
CPC .... H01J 49/427; H01J 49/424; H01J 49/4245; G02F 1/29; G02F 3/026; G02F 3/02; H01S 3/0071; G06N 10/40; G06N 10/20
See application file for complete search history.

(56) References Cited

U.S. PATENT DOCUMENTS 10,504,033 B1 * 12/2019 King ....................... G06N 10/60
10,753,877 B1 * 8/2020 Schwemmer ...... G01N 15/1484
(Continued)

FOREIGN PATENT DOCUMENTS

EP 4318329 A1 * 2/2024 ............. G06N 10/40
EP 4322071 A1 * 2/2024 ............. G06N 10/40
(Continued)

OTHER PUBLICATIONS

Kim, "Acousto-Optic Devices for Optical Signal Processing and Quantum Computing", 2014, Retrieved from the Internet: URL:https://www.researchgate.net/profile/Sangtaek_Kim/publication/234 799492_Acoustooptic_devices_for_optical_signal_processing_and_quantum_computing/links/0c96052fd499bb9f15000000/ Acousto-optic-Devices-foroptical-signal-processing-and-quantum-computing.pdf, [retrieved on Sep. 30, 2023].

(Continued)

*Primary Examiner* — David A Vanore
(74) *Attorney, Agent, or Firm* — The Webb Law Firm

(57) ABSTRACT

Some embodiments in the present disclosure relate to an apparatus and methods to excite a trapped ion. A first laser beam and a second laser beam pass through at least one common lens of an objective. The two laser beams are focused by said objective at the position of the trapped ion. A moving standing wave is generated at the position of the trapped ion, which induces a force on the trapped ion. Two ions may be entangled by generating such moving standing wave at the respective positions of both of said ions.

13 Claims, 10 Drawing Sheets

(51) Int. Cl.
    *G02F 3/02*        (2006.01)
    *G06N 10/40*     (2022.01)
    *H01S 3/00*       (2006.01)

(52) U.S. Cl.
    CPC ........ *H01J 49/4245* (2013.01); *H01S 3/0071* (2013.01); *G06N 10/40* (2022.01)

(56) References Cited

U.S. PATENT DOCUMENTS

| | | | |
|---|---|---|---|
| 12,079,692 | B2 * | 9/2024 | Bohn ...................... G02F 1/353 |
| 12,376,500 | B2 * | 7/2025 | Knapp ................. H10N 60/128 |
| 2012/0068066 | A1 * | 3/2012 | Takaya ................... G01B 11/14 |
| | | | 250/306 |
| 2020/0116623 | A1 * | 4/2020 | Cooper-Roy .......... G06N 10/70 |
| 2020/0372392 | A1 * | 11/2020 | Nam ...................... G06N 10/40 |
| 2021/0049495 | A1 * | 2/2021 | King ...................... G06N 20/20 |
| 2021/0365827 | A1 * | 11/2021 | Monroe ................. G06N 10/40 |
| 2023/0013702 | A1 * | 1/2023 | Elben ...................... G06N 7/01 |
| 2023/0132301 | A1 * | 4/2023 | Debnath ................ G06N 10/40 |
| | | | 356/301 |
| 2023/0230828 | A1 * | 7/2023 | Higgins .............. H01J 49/4245 |
| | | | 250/292 |
| 2023/0275394 | A1 * | 8/2023 | Takekoshi ............. H01S 3/2391 |
| | | | 372/29.022 |
| 2023/0419147 | A1 * | 12/2023 | Li ............................ G06F 15/82 |
| 2023/0420241 | A1 * | 12/2023 | Erhard ................... G06N 10/40 |
| 2024/0046130 | A1 * | 2/2024 | Jin ......................... G06N 10/20 |
| 2024/0371624 | A1 * | 11/2024 | Holz .................... H01J 49/424 |
| 2025/0278655 | A1 * | 9/2025 | Chiaro ................... G06N 10/60 |

FOREIGN PATENT DOCUMENTS

| | | | | | |
|---|---|---|---|---|---|
| JP | H03101419 | A | 4/1991 | | |
| JP | 2002510523 | A | 4/2002 | | |
| JP | 2005335020 | A | 12/2005 | | |
| JP | 2008120787 | A | 5/2008 | | |
| JP | 2010519996 | A | 6/2010 | | |
| JP | 2016521614 | A | 7/2016 | | |
| JP | 2018526090 | A | 9/2018 | | |
| JP | 2022533961 | A * | 7/2022 | ............ | G06N 10/20 |
| WO | 9951163 | A1 | 10/1999 | | |
| WO | 2006027863 | A1 | 3/2006 | | |
| WO | 2008107483 | A2 | 12/2008 | | |
| WO | 2014202199 | A1 | 12/2014 | | |
| WO | 2017032837 | A1 | 3/2017 | | |
| WO | 2022090381 | A1 | 5/2022 | | |
| WO | WO-2022251435 | A1 * | 12/2022 | ............ | G02F 3/022 |
| WO | WO-2022256166 | A2 * | 12/2022 | ............ | G06N 10/00 |
| WO | WO-2023215010 | A2 * | 11/2023 | ............ | G06N 10/40 |
| WO | WO-2024085925 | A2 * | 4/2024 | ............ | B82Y 10/00 |
| WO | WO-2025245296 | A1 * | 11/2025 | ............ | G06N 10/00 |

OTHER PUBLICATIONS

Haffner et al., "Quantum computing with trapped ions", Physics Reports, 2008, arXiv:0809.4368v1, pp. 1-99.

Pernthaler, "Single Ion Addressing of Up to 50 Ions", A master's thesis submitted to the Faculty of Mathematics, Computer Science and Physics of the Leopold-Franzens University of Innsbruck, Aug. 2019, pp. 1-69.

Rickert, "Simultaneous and individual ion addressing for quantum information processing", Master's Thesis, Leopold-Franzens University of Innsbruck, Nov. 2018, pp. 1-85.

Walther et al., "Precision measurements in ion traps using slowly moving standing waves", arXiv:1105.1710v1, May 2011, pp. 1-7.

Fuse et al. "Attachment of Human Gingival Fibroblasts onto collagen PLA porus scaffold", Japanese Association of Regenerative Dentistry, 2009, vol. 7, pp. 1-9 (English-language Abstract).

Urita et al. "Evaluation of diaphragmatic hernia repair using PLGA mesh-collagen sponge hybrid: an experimental study in a rat model", Pediatric Surgery Int., 2008, No. 24, pp. 1041-1045.

* cited by examiner

SINGLE-SIDED STANDING WAVE FOR EXCITING TRAPPED IONS

CROSS-REFERENCE TO RELATED APPLICATION

This application claims priority to European Patent Application No. 22178978.7 filed Jun. 14, 2022, the disclosure of which is hereby incorporated by reference in its entirety.

BACKGROUND OF THE INVENTION

Field of the Invention

Embodiments of the present disclosure relate to the field of excitation or entanglement of ions.

Description of Related Art

Many technical applications (e.g. quantum computing, quantum simulations, atomic and molecular experiments, spectroscopy, atomic clocks, etc.) require excitation of ions using two or more laser beams while providing limited optical access to the target due to the setup of said application.

For example, the ion to be excited may be trapped in an ion trap. A setup of such ion trap may include a plurality of electrodes within a vacuum chamber. However, said components may reduce the optical access to the trapped ion.

For example, in the field of quantum computing, such trapped ions are used as qubit registers. To perform quantum operations by implementing quantum gates on said ion register, one or more trapped ions are excited and/or entangled using laser beams directed to the trapped ions.

SUMMARY OF THE INVENTION

It may be desirable to perform the excitation of a trapped ion by a single-sided access to the trapped ion.

In some embodiments, this is achieved by producing a standing wave by combining two laser beams that are both focused by a common lens.

The present disclosure is defined by the scope of independent claims. Some of the advantageous embodiments are provided in the dependent claims.

According to an embodiment, an apparatus for exciting a trapped ion is provided. The apparatus comprises a laser unit configured to emit a first laser beam and a second laser beam, the first laser beam having a first frequency and the second laser beam having a second frequency, the first frequency being different from the second frequency; an objective configured to focus the first laser beam and the second laser beam at a position of the trapped ion, wherein the first laser beam and the second laser beam pass through at least one common lens within the objective; and a controller configured to control said laser unit to generate a moving standing wave at the position of the trapped ion, which induces a force on the trapped ion, using the first laser beam and the second laser beam.

In an exemplary implementation, the force induced by the moving standing wave at the position of the trapped ion is one or more of a state-dependent force, and a force perpendicular to an optical axis of the objective to the trapped ion.

For example, the objective is further configured to direct the first laser beam and the second laser beam with a same propagation direction to the at least one common lens.

In an exemplary implementation, the controller is further configured to control one or more optical components to direct the first laser beam and the second laser beam to obtain a same propagation direction of the first laser beam and the second laser beam before the passing of the at least one common lens.

For example, the first laser beam and the second laser beam are separated by a predetermined distance before the passing of the at least one common lens.

In an exemplary implementation, the first frequency and the second frequency differ by a frequency corresponding to a motional mode of the trapped ion and a predetermined detuning.

For example, the trapped ion is a first trapped ion, a second trapped ion is located in a focal plane of the objective, and the first and the second trapped ion are located on a trap axis, the laser unit is further configured to emit a third laser beam and a fourth laser beam, the third laser beam having a third frequency and the fourth laser beam having a fourth frequency, the third frequency being different from the fourth frequency; wherein the third laser beam and the fourth laser beam pass through the at least one common lens within the objective; and the controller further configured to control said laser unit to induce a force on the second trapped ion using the third laser beam and the fourth laser beam.

In an exemplary implementation, the propagation direction of the first and the second laser beam before passing the at least one common lens differs from a propagation direction of the third and the fourth laser beam before passing the at least one common lens in a respective angle of incidence with respect to a principle plane of objective.

For example, the first laser beam and the second laser beam are separated by a predetermined distance in an axial direction with respect to the trap axis before passing the at least one common lens for an axial excitation of the first trapped ion, or the first laser beam and the second laser beam are separated by a predetermined distance in a radial direction with respect to the trap axis before passing the at least one common lens for a radial excitation of the first trapped ion.

In an exemplary implementation, the controller is further configured to control said laser unit to simultaneously induce a force on the first trapped ion using the first laser beam and the second laser beam and a force on the second trapped ion using the third laser beam and the fourth laser beam.

For example, the controller is further configured to control said laser unit to generate a moving interference pattern at the position of the first trapped ion and at the position of the second trapped ion.

In an exemplary implementation, the first trapped ion and the second trapped ion are included in a quantum system, the first frequency and the second frequency differ by a mode frequency of said quantum system and a predetermined detuning, the third frequency and the fourth frequency differ by the mode frequency of said quantum system and the predetermined detuning.

For example, the first frequency is based on a transition from a first state to a virtual state of the first ion, the second laser beam having the second frequency and a fifth frequency, the second frequency is based on a red sideband transition from the virtual state to a second state of the first ion and a first predetermined detuning, the fifth frequency is based on a blue sideband transition from the virtual state to the second state of the first ion and a second predetermined detuning, the third frequency is based on a transition from a first state to a virtual state of the second ion, the fourth laser beam having the fourth frequency and a sixth frequency, the fourth frequency is based on a red sideband transition from a virtual state to a second state of the second ion and a third predetermined detuning, the sixth frequency is based on a blue sideband transition from the virtual state to the second state of the second ion and a fourth predetermined detuning.

According to an embodiment, a method for exciting a trapped ion is provided. The method comprises generating a first laser beam and a second laser beam, the first laser beam having a first frequency and the second laser beam having a second frequency, the first frequency being different from the second frequency, the first laser beam and the second laser beam being focused at a position of the trapped ion, wherein the first laser beam and the second laser beam pass through at least one common lens within an objective; and generating a moving standing wave at the position of the trapped ion, which induces a force on the trapped ion, using the first laser beam and the second laser beam.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter.

BRIEF DESCRIPTION OF THE DRAWINGS

An understanding of the nature and advantages of various embodiments may be realized by reference to the following figures.

DESCRIPTION OF THE INVENTION

Figure 1:
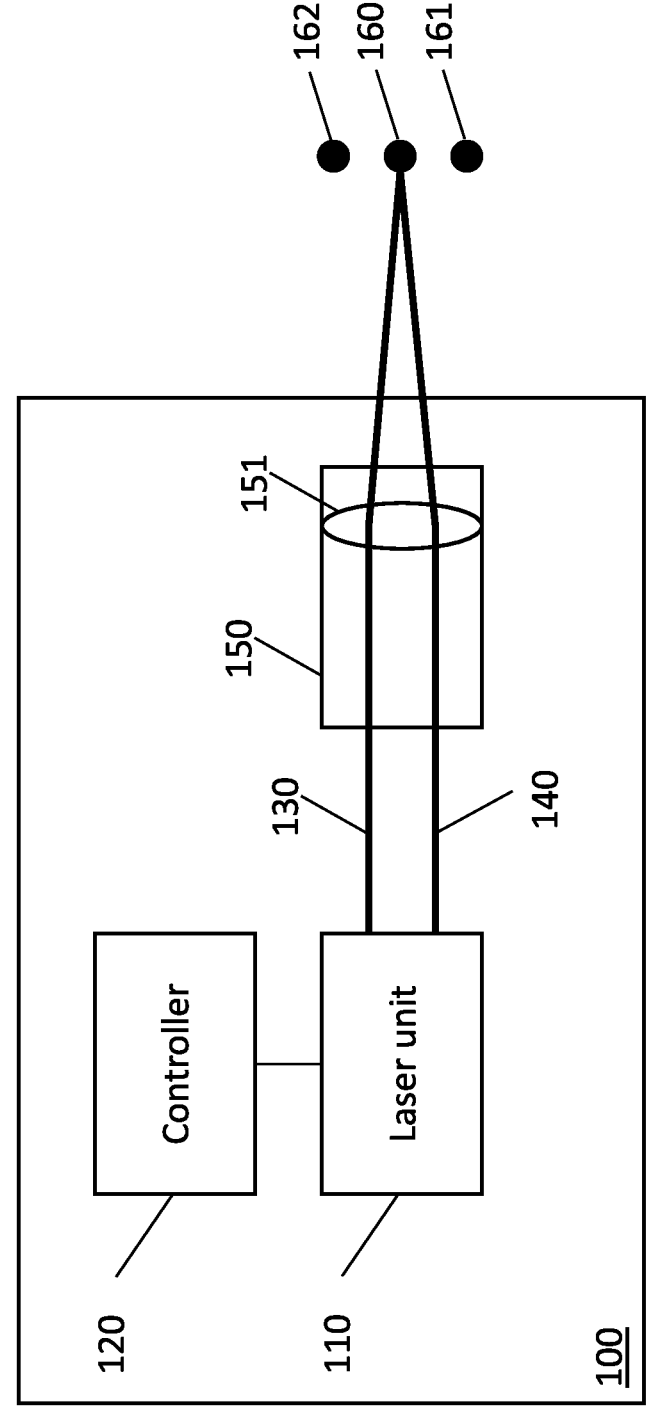
FIG. 1 is a block diagram illustrating an apparatus for exciting a trapped ion.

In the following description, reference is made to the accompanying FIGS., which form part of the disclosure, and which show, by way of illustration, specific aspects of embodiments of the present disclosure or specific aspects in which embodiments of the present invention may be used. It is understood that embodiments of the present disclosure may be used in other aspects and comprise structural or logical changes not depicted in the FIGS. The following detailed description, therefore, is not to be taken in a limiting sense, and the scope of the present disclosure is defined by the appended claims.

It is understood that the features of the various exemplary embodiments and/or aspects described herein may be combined with each other, unless specifically noted otherwise.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Quantum Computing

In quantum computing, quantum bits or qubits represent the basic unit of quantum information, corresponding to the quantum version of the binary digit (bit) representing a "0" and a "1" in a classical computer. A qubit is represented by a two-state (or two-level) quantum-mechanical system. In principal, such a quantum mechanical system may have more than two states. However, a suitable system is required to have at least two reliably distinguishable quantum states.

There are various physical systems, which include at least two distinguishable quantum states, for example, electron or nuclear spin states, atomic or nuclear states, nuclear magnetic resonance states, electronic states in quantum dots or the like.

For example, in a system using trapped ions (i.e. atoms or molecules with a net electrical charge), qubit states may be controlled and read out using radiation provided from one or more laser beams. Suitable elements include, for example, Beryllium Be, Magnesium Mg, Calcium Ca, Strontium Sr, Barium Ba, Radium Ra, and Ytterbium Yb.

The internal qubit levels of the ion may be chosen as a ground level and a long-lived excited level, a so-called metastable level, forming a so-called optical qubit. In optical qubits, quantum information is encoded in two electronic states connected by an electric multipole transition with frequency in the optical domain, i.e. a frequency in the range from 380 THz to 800 THz.

Alternatively, the qubit levels of the ion may be two different magnetic sublevels within the ground state of the ion with transition frequencies in the microwave to radio-wave domain, forming a so-called Zeeman qubit or hyper-fine qubit. Changing the state of a hyperfine qubit may involve the application of stimulated Raman transitions between the levels. Raman transitions facilitate an adiabatic transfer of an electron from a first hyperfine state to the second hyperfine state via a virtual intermediate state. Said transitions may have optical wavelengths.

Moreover, the motion of the trapped and crystallized ions becomes quantized, as the ions form a sufficiently well isolated quantum system within the ion trap. For example, the ions form a linear chain in the trap, e.g. a Paul trap, a Penning trap or the like. Ion traps are explained in detail in the section Ion traps. The motional modes, e.g. vibrational modes, of the entire linear chain of ions may be described by a quantum mechanical harmonic oscillator. The normal modes of a two ion crystal are the "center of mass mode" at frequency $\omega_c$, where the displacement of two ions from equilibrium is the same, and the "stretch mode" at frequency $\omega_S = 3^{1/2} \omega_C$, where the displacements are equal but in oppo-site directions. Two low-level states of such vibrational states may form a so-called motional qubit.

Using interaction with laser beams, trapped ions may be cooled to near their motional ground states. Such cooling of the ions may involve Doppler cooling and/or sideband cooling. Initialization of the internal qubits may be per-formed similarly by laser beam-induced transitions in indi-vidual ions. Qubits may be read out by applying a resonant laser beam to detect their states by fluorescence. A rapid cycling single photon transition from one of the qubit levels to a higher excited level of the ion using such a resonant laser beam results in the emission of fluorescent photons, which may be detected, if the level is populated. If the level is not populated, no fluorescent photons will be detected apart from a randomly produced dark count.

The interaction with laser beams also facilitates transi-tions between the two states (i.e. single-qubit operations). A pair of qubits may be entangled (i.e. two-qubit gate opera-tions) by qubit-state dependent force using laser pulses that couple the individual qubit state to the collective motional modes of the trapped ions. Similar operation may be also applied to more than two ions. These and further examples of one or more qubit operations are provided, e.g., in H. Häffner, C. F. Roos, R. Blatt, "*Quantum computing with trapped ions*", *Physics Reports*, Volume 469, Issue 4, 2008, Pages 155-203 (https://doi.org/10.1016/j.phys-rep.2008.09.003) or in G. Chen, et al. *Quantum Computing Devices: Principles, Designs, and Analysis*. USA, CRC Press, 2019.

Quantum Gates

A quantum gate is a basic circuit operation on one or more qubits. Quantum gates performed on ion qubits include controlled operations induced by interactions of the ions with laser beams, thus manipulating the state of the qubit. Such single and multiple qubit operations facilitate the implementation of quantum gates, for example, a controlled NOT-gate (CNOT gate), a Hadamard-gate (H-gate) and a Phase-gate (P-gate), that together form a universal set of gates.

Single qubit operations result in wave function rotations of the internal states of a single ion. For example, such single qubit operation may keep the same motional quantum state, when operating on the internal qubit states. Applying an electromagnetic field having a suitable frequency for an appropriate time duration performs such rotation on the internal qubit by an angle. The acquired angle may depend on the interaction with the electromagnetic field such as intensity, duration or the like, or on properties of the ion, such as energy levels of the qubit states, or the like.

Two-qubit gate operations couple the wave functions of two qubits conditionally, i.e. the so-called entanglement. An entangling operation may be described as a simultaneous rotation of the respective wave functions of two or more qubits. For example, the internal qubit may be coupled to the motional qubit in a way that is determined by the state of the motional qubit. For example, the internal qubit of a first ion may be coupled to the internal qubit of a second ion.

A Molmer-Sorensen gate (MS-gate) entangles the internal qubits of two or more ions including the use of two laser beams detuned by a frequency $\delta$ from the first blue and the first red motional sidebands of the respective ions. In par-ticular, the MS-gate employs stimulated Raman transitions on the internal qubit states.

The terms red sideband and blue sideband refer to tran-sitions from/to a (virtual) state to/from one of the states $|n-1\rangle$ and $|n+1\rangle$, which are neighboring states to a motional state $|n\rangle$. The transition from or to said (virtual) state, which has an energy difference larger than the transition from said (virtual) state to the state $|n\rangle$, is called blue sideband. The transition from or to said (virtual) state, which has an energy difference smaller that the transition from said (virtual) state to the state $|n\rangle$, is called red sideband.

Figure 2:
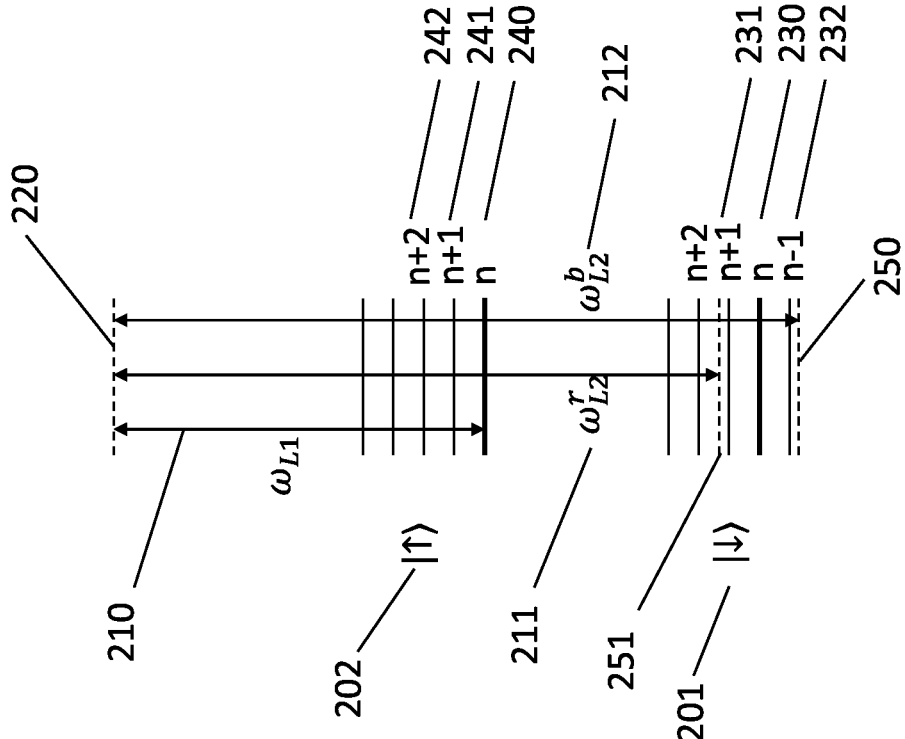
FIG. 2 illustrates exemplary energy levels of an ion and transition frequencies for a Raman-type Molmer-Sorensen gate.

FIG. 2 exemplarily shows the internal and motional states of an ion. The internal states 201 and 202 form the two states $|\downarrow\rangle$ and $|\uparrow\rangle$ of the internal qubit, which may also be labeled as $|0\rangle$ and $|1\rangle$. The motional states 230 to 232 and 240 to 242 of the ion are labeled by the quantum number n, e.g. $|n-1\rangle$, $|n\rangle$, $|n+1\rangle$. The energy difference of the internal states $|\downarrow\rangle$ and $|\uparrow\rangle$, while not changing the motional state of the ion, is given by $\Delta E = \hbar\omega_0$. The energy difference of two neigh-boring motional states, for example, $|n\rangle$ and $|n+1\rangle$, while not changing the internal state of the ion, is given by $\Delta E = \hbar\omega_M$. Due to the harmonic oscillator potential describ-ing the motional states, any of two neighboring motional states have the same energy difference.

The red motional sideband explained above, corresponds in the example of FIG. 2 to the transition from the virtual state 220 to the state $|\downarrow\rangle |n+1\rangle$ 231. The blue motional sideband corresponds in the example of FIG. 2 to the transition from the virtual state 220 to the state $|\downarrow\rangle |n-1\rangle$ 232.

The above-mentioned detuning $\delta$ corresponds to a shift in the frequency of a laser compared to a resonant frequency of a quantum system. Lasers tuned to a frequency below said resonant frequency are called red-detuned, and lasers tuned above said resonant frequency are called blue-detuned. The shift in frequency, which corresponds to a shift in energy, may be chosen such that the shift is smaller than the energy difference of neighboring resonant states to the state having said resonant frequency. For example, for a frequency difference of neighboring resonances within the range 300 kHz to 5000 kHz the detuning $\delta$ may be chosen to be smaller than said frequency difference. Thus, in this example, a detuning in the range of 1 kHz to 100 kHz may be chosen according to the frequency difference of neighboring resonances. The detuning δ may depend on a desired gate speed, the number of ions to be excited, properties of the setup, or the like. A laser frequency closer to the resonant frequency, i.e. a smaller detuning δ, may increase the gate speed.

In the example of FIG. 2, the energy level 250 is red-detuned by a frequency δ from the energy level of $|\downarrow\rangle$ $|n-1\rangle$ 232 and the energy level 251 is blue-detuned by a frequency δ from the energy level of $|\downarrow\rangle$ $|n+1\rangle$ 231.

The evolution of the wave function of the two ions due to a MS-gate can be summarized by:

$$|\downarrow\rangle\,|\downarrow\rangle \to \cos\theta|\downarrow\rangle\,|\downarrow\rangle + i\sin\theta|\uparrow\rangle\,|\uparrow\rangle,$$

$$|\downarrow\rangle|\uparrow\rangle \to \cos\theta|\downarrow\rangle\,|\uparrow\rangle - i\sin\theta|\uparrow\rangle\,|\downarrow\rangle,$$

$$|\uparrow\rangle\,|\downarrow\rangle \to \cos\theta|\uparrow\rangle\,|\downarrow\rangle - i\sin\theta|\downarrow\rangle\,|\uparrow\rangle,$$

$$|\uparrow\rangle\,|\uparrow\rangle \to \cos\theta|\uparrow\rangle\,|\uparrow\rangle + i\sin\theta|\downarrow\rangle\,|\downarrow\rangle.$$

Here, $|\downarrow\rangle$ and $|\uparrow\rangle$ refer to the two states of the internal qubit and θ is a phase depending, for example, on the laser pulse duration, the properties of the quantum systems or the like. Such operation creates an entanglement of the two or more ions, a degree of the entanglement is depending on the phase θ. For example, a phase of $$\theta = \frac{\pi}{2}$$

results in maximally entangled states.

Such an entanglement may be performed globally on a plurality of trapped ions or locally on two or more selected ions. The motional state of the ion(s) is not changed by the MS-gate.

A light shift gate (LS-gate), also called geometric phase gate, operating on two ions accumulates a net phase shift if the two ions are in different internal qubit states. If the two ions are in a same internal qubit state, no net phase shift is acquired. The LS-gate is formally the same as the MS-gate in a rotated basis; however, differs in its implementation.

As mentioned above, the motion of the particles is strongly coupled by the mutual Coulomb repulsion of said particles and can be described in terms of normal modes. The state-dependent displacement force for an LS-gate is implemented with two laser beams whose frequencies have a relative detuning $\Delta\omega = \psi_{L1} - \omega_{L2} = \omega_S + \delta$ close to the frequency of the stretch mode. The detuning δ is small compared to the stretch mode frequency: $|\omega_S| \ll |\delta|$.

Figure 3:
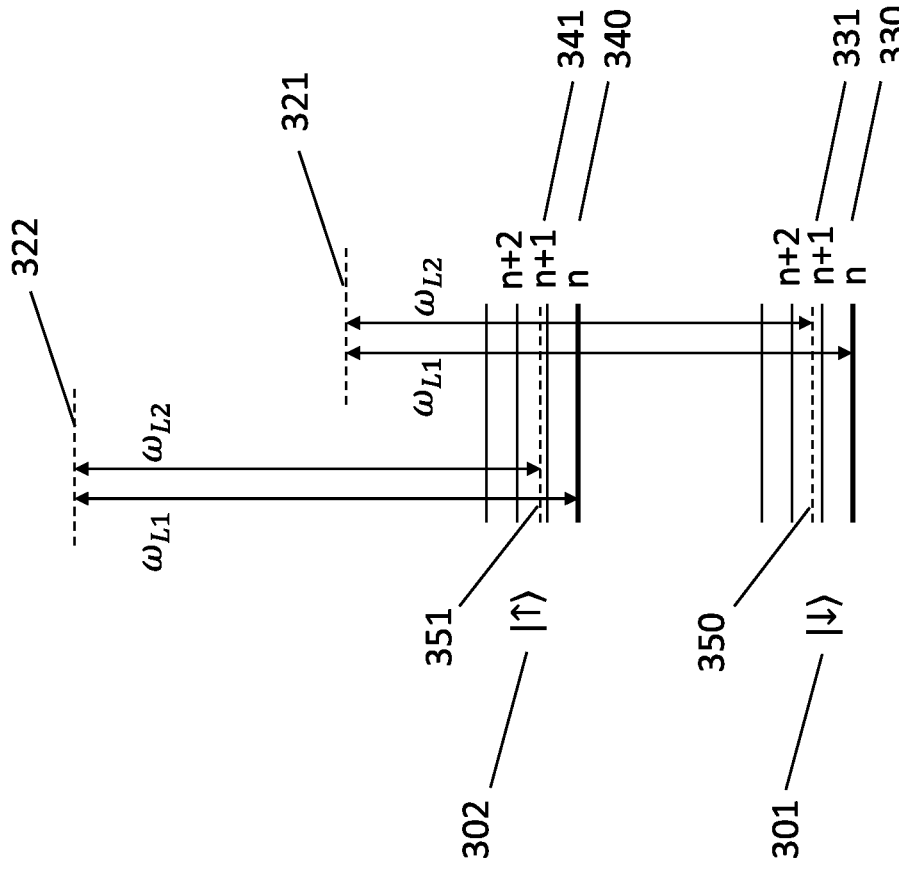
FIG. 3 illustrates exemplary energy levels of an ion and transition frequencies for a light shift gate.

FIG. 3 exemplarily shows, similar to FIG. 2, the internal and motional states of an ion. The internal states 301 and 302 form the two states $|\downarrow\rangle$ and $|\uparrow\rangle$ of the internal qubit. The motional states 330, 331, 340 and 341 of the ion are labeled by the quantum number n, e.g. $|n\rangle$, $|n+1\rangle$. The energy difference of the internal states $|\downarrow\rangle$ and $|\uparrow\rangle$, while not changing the motional state of the ion, is given by $\Delta E = \hbar\omega_0$. The energy difference of two neighboring motional states, for example, $|n\rangle$ and $|n+1\rangle$, while not changing the internal state of the ion, is given by $\Delta E = \hbar\omega_M$.

In FIG. 3, the first laser beam having frequency $\omega_{L1}$ drives a transition to or from a virtual level 321 or 322 from or to a motional state $|\downarrow\rangle$ 330 or 340. The second laser beam having frequency $\omega_{L2}$ drives a transition to or from a virtual level 321 or 322 from or to an energy level 350 or 351, which is detuned by a frequency δ from a motional state $|n+1\rangle$ 331 or 341. Such detuning may be chosen analogously to a detuning for a MS-gate.

An interference pattern generated by the laser beams has the same phase at the position of both ions. Therefore, when the ions are in the same internal state, the dipole force driving each ion will be the same and no differential force arises, so the stretch mode is not excited. On the other hand, if the ions are in different internal states, a differential force exists between them, exciting the stretch mode.

The acquired phase shift is determined by a detuning δ and a displacement pulse duration. Due to detuning δ, the driving force is asynchronous with the stretch mode frequency, but re-synchronizes after a duration $T = 2\pi/\delta$. During this time, the state of the motion is displaced along a circular path in phase space returning to the original point in phase space after time T while acquiring a geometric phase equal to the enclosed phase space area. By choosing the intensity of the laser beams, for example, a π/2-phase shift may be acquired.

The evolution of the wave function of the two ions due to a LS-gate applying a π/2-phase shift may be summarized by:

$$|\downarrow\rangle\,|\downarrow\rangle \to |\downarrow\rangle\,|\downarrow\rangle$$

$$|\downarrow\rangle\,|\uparrow\rangle \to e^{i\pi/2}|\downarrow\rangle\,|\uparrow\rangle$$

$$|\uparrow\rangle\,|\downarrow\rangle \to e^{i\pi/2}|\uparrow\rangle\,|\downarrow\rangle$$

$$|\uparrow\rangle\,|\uparrow\rangle \to |\uparrow\rangle\,|\uparrow\rangle = e^{i\pi}(e^{i\pi/2}|\uparrow\rangle)(e^{i\pi/2}|\uparrow\rangle))$$

Such a LS-gate is equivalent to a universal controlled 7-phase gate including π/2 individual qubit phase shifts on the $|\uparrow\rangle$ states.

Such state-dependent dipole force, i.e. the force depending on the internal qubit state of the ion, results in an entangling operation due to the conditional excitation.

Ion Traps

In the following, the term "ion trap" refers to any device employable to trap ions, using electric and/or magnetic field. For instance, an ion trap may be a Penning trap; a Paul trap; a three dimensional, 3D, ion trap; and/or a linear 3D trap. In this disclosure, the term ion trap refers to an assembly with a plurality of electrodes which, when driven, generate an electric field that limits (traps) the freedom of movement of ions so that they may not escape a particular (preferably small) region in the vicinity of those electrodes. It is noted that the actual ion trap device/system may include further mechanical and electrical components such as fixing means, electrical contacts, housing, power source, control circuitry, means to cool ions or the like.

Here, the term "3D trap" refers to all traps, which are not surface traps. Surface traps are traps where all electrodes are located in a same plane. In particular, a 3D trap may be a Penning or a Paul trap. Usually, 3D ion traps have a rotational symmetry, e.g., a discrete cylindrical symmetry or a continuous cylindrical symmetry.

Henceforth, without loss of generality, the symmetry axis of such a cylindrical symmetry is assumed to be parallel to the z-axis of a Cartesian coordinate system in which the axes are represented by three mutually orthogonal unit vectors $\hat{e}_x$, $\hat{e}_y$, and $\hat{e}_z$. In this context, the symmetry axis is also referred to as the "axial direction", and $\hat{r}(x,y) = (x\hat{e}_x + y\hat{e}_y)/\sqrt{x^2 + y_2}$ as the "radial direction" (at the point $(x,y,0) = x\hat{e}_x + y\hat{e}_y$). It is further noted that the symmetry axis may also be the axis along which multiple trapped ions typically align.

The term "Penning trap" refers to a trap that uses static electric and static magnetic fields to trap the ions. Usually, in a Penning trap solely static electric fields are used. In other words, usually no oscillating and/or alternating fields are used. For instance, to confine charged particles radially, a static magnetic field $\hat{B}=B_z\hat{e}_z$, in the axial direction may be used. The magnetic field $\vec{B}$ forces the charged particles to perform circular motion with angular frequency $\omega=|B_z|\cdot q/m$, where q and m are respectively charge and mass of the charged particles. Furthermore, in order to confine the charged particles axially, a static electric quadrupole potential $V(z,r)=V_0(z^2-r^2/2)$ may be used.

The term "Paul trap" refers to a trap that uses electric fields to trap the ions. Usually, in a Paul trap, only electric fields are used to trap the ions. In particular, usually no magnetic fields are used. In general, at least one of the electric fields of a Paul trap is alternating (e.g., oscillating), and a Paul trap may use both static as well as alternating electric fields. For example, the alternating field of a Paul trap may be an alternating electric multipole field, in particular, an electric quadrupole field. Since the switching of the voltage is often at radio frequency, these traps are also called Radio Frequency (RF) traps.

A linear 3D trap is a particular type of a 3D trap. Usually, in a linear 3D trap, the ions are confined radially using an alternating (AC) electric field and confined axially by static (DC) electric potentials. Accordingly, a linear Paul trap is in general also a (linear) Paul trap.

Excitation of Trapped Ions

As indicated above, a prerequisite to perform quantum gate operation is a controlled excitation of internal and/or motional states of one or more trapped ions. The one or more ions may be trapped in an ion trap as explained above in the section Ion traps.

The excitation of an ion is performed, for example, by an apparatus as depicted in FIG. 1. An apparatus 100 for exciting such a trapped ion 160 comprises a laser unit 110 that is configured to emit a first laser beam 130 and a second laser beam 140. The first laser beam 130 has a first frequency $\omega_{L1}$ and the second laser beam 140 has a second frequency $\omega_{L2}$. The first frequency is different from the second frequency. For example, the laser unit 110 may generate two laser beams having different frequencies. For example, the laser unit 110 may generate a single laser beam and obtain two laser beams by splitting the generated beam and adjust the frequencies of one or both of said laser beams. A frequency adjustment is performed, for example, by an acousto-optic modulator (AOM) or the like. The propagation direction of each of the first laser beam 130 and the second laser beam 140 is given by its respective wave vector $\vec{K}_1$ or $\vec{K}_2$.

However, the laser unit 110 is not limited to the emitting of two laser beams. In general, the laser unit may be configured to emit two or more laser beams.

For example, the laser unit 110 may include a stabilized diode laser. The frequency/phase and amplitude of the individual beams are modulated, for example, with AOMs in a double-pass configuration. However, the present disclosure is not limited to any particular laser source and other lasers than diode lasers such as solid-state crystal lasers could be used.

The apparatus 100 is further comprising an objective 150 configured to focus the first laser beam 130 and the second laser beam 140 at a position of the trapped ion 160. The first laser beam 130 and the second laser beam 140 pass through at least one common lens 151 within the objective 150. For example, when the ion 160 is trapped in a linear ion trap, the trap axis may be included in the focal plane of the objective 150.

Such an objective including at least one common lens, which is passed by both of the laser beams, facilitates the excitation of a trapped ion by a single-sided access to the trap that includes said ion.

The laser unit 110 is controlled by a controller 120 such that a so-called moving standing wave is generated at the position of the trapped ion 160, which induces a force on the trapped ion 160, using the first and the second laser beam. A moving standing wave is a standing wave, whose nodes move at a same velocity. Said velocity depends on the difference of the first frequency $\omega_{L1}$ and the second frequency $\omega_{L2}$. The propagation direction of the (nodes of the) moving standing wave depends on the direction of the resulting wave vector $\vec{K}'=\vec{K}_1-\vec{K}_2$ of the first and the second laser beam.

The force induced by the moving standing wave may act on the trapped ion 160, the trapped ion being a first trapped ion 160. Moreover, the moving standing wave may induce a force on a second trapped ion 161. In an exemplary implementation, the first trapped ion 160 and the second trapped ion 161 may be included in a plurality of trapped ions 160 to 162. The plurality of trapped ions may form a linear chain. In said exemplary implementation, the second trapped ion 161 may be a neighboring ion of the first trapped ion 160 within such a linear chain. Such linear chain may be included in a two-dimensional mesh of ions.

The force, which is induced by the moving standing wave at the position of the trapped ion 160, may be a state-dependent force. Such a state-dependent force depends on the state of the trapped ion 160. As explained in section Quantum gates, such a state-dependent force is applied to perform entanglement of qubits. For example, the force depends on the qubit state of the trapped ion. The induced force may act on the ion perpendicular to an optical axis of the objective 150. In other words, the direction of the force lies within the focal plane of the objective 150.

The objective may be configured to direct the first laser beam 130 and the second laser beam 140 with a same propagation direction to the at least one common lens 151. In other words, the first laser beam 130 and the second laser beam 140 propagate in parallel before passing the at least one common lens 151. The objective 150 may include optical components in addition to the at least one common lens 151, for example, mirrors, additional lenses or the like, to direct the laser beams to the common lens 151. The additional optical components may part of the optical path of the first laser beam 130 and/or the second laser beam 140. Thus, the objective 150 may receive laser beams not having a same propagation direction.

Alternatively, the objective 150 (and the common lens 151) may receive parallel propagating laser beams. In such exemplary case, the first laser beam 130 and the second laser beam 140 may share an optical path within the objective 150.

To obtain parallel laser beams one or more optical components may be included in the optical path of the first laser beam 130 and/or the second laser beam 140. Such optical components may be static or dynamically controllable by the controller 120. The one or more optical components may include one or more mirrors, one or more additional lenses, an addressing unit, or the like.

For example, the one or more optical components are included in the laser unit 110. Thus, the two or more laser beams having a same propagation direction may be emitted by the laser unit 110. For example, the one or more optical components are positioned between the laser unit 110 and the objective 150.

Figure 4:
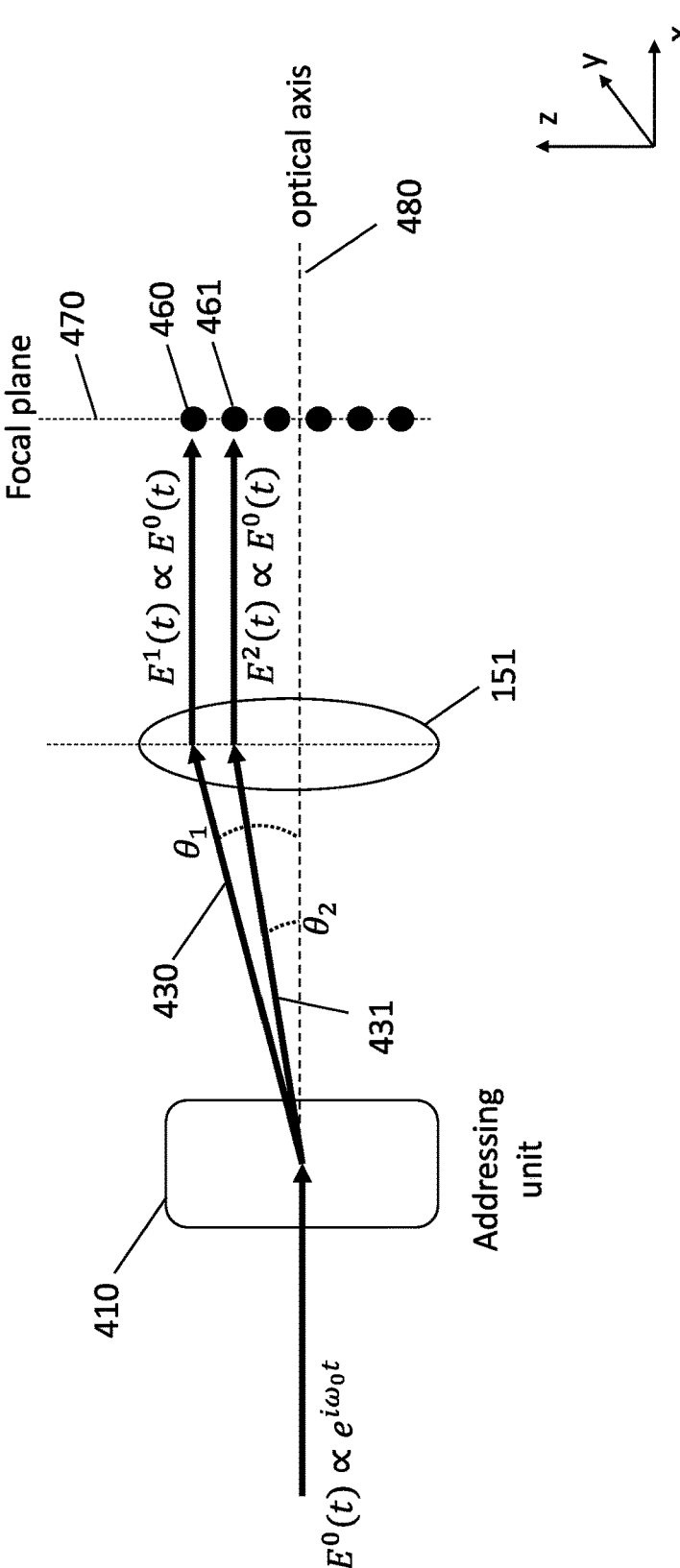
FIG. 4 is a schematic diagram illustrating the addressing of two ions.

The apparatus 100 for exiting a trapped ion 160 may further include an addressing unit, which facilitates focusing the first and the second laser beam at different possible positions of a trapped ion. For example, as shown in FIG. 4, the addressing unit 410 may direct the laser beam(s) 430 and 431 to any ion 460 and 461 within a plurality of trapped ions. As shown exemplarily in FIG. 4, ion 460 may be illuminated by laser beam 430 having an inclination angle $\theta_1$ with respect to the optical axis 480. Ion 461 may be illuminated by laser beam 431 having an inclination angle $\theta_2$ with respect to the optical axis 480.

Figure 5:
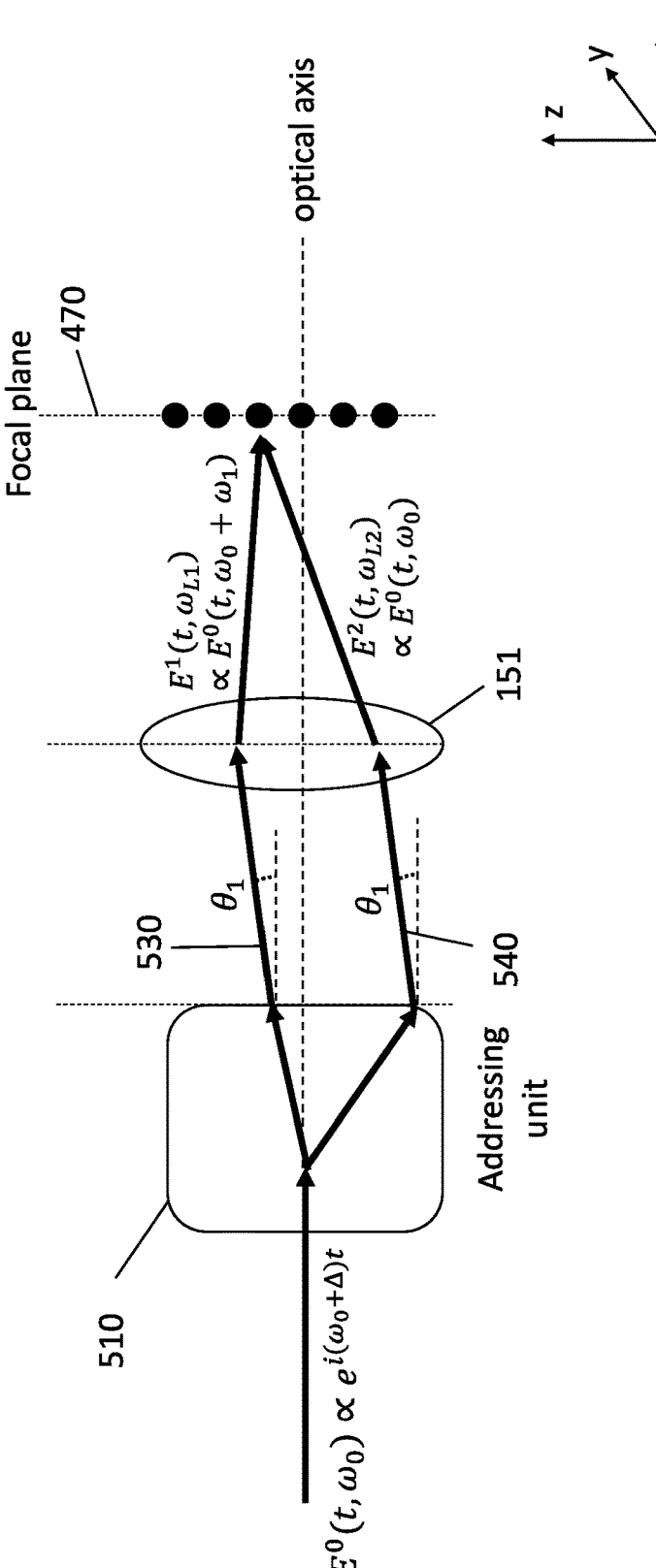
FIG. 5 is a schematic diagram illustrating the addressing of a single ion with two parallel laser beams.

For example, as illustrated in FIG. 5, the addressing unit 510 includes one or more optical components to obtain a same propagation direction of the first laser beam 530 and the second laser beam 540. The addressing unit 510 may further include means to adapt the frequency of one or more of the laser beams. As mentioned above such frequency adaption may be performed by an AOM or by other means.

The first laser beam 130 and the second laser beam 140 are separated, for example, by a predetermined distance before passing the common lens 151. The distance may be adapted by static and/or dynamic controllable optical components. A maximal distance of the first and the second laser beam is given by the aperture of the objective 150. A larger distance of the first and the second laser beam results in a smaller wavelength of the moving standing wave. A smaller wavelength of the moving standing wave may increase the induced force. For example, the distance of the two laser beams may be predetermined by a fixed optics.

FIG. 3 exemplarily illustrates energy levels of motional mode $|n_i\rangle$ for each internal qubit state $|\downarrow\rangle$ 301 and $|\uparrow\rangle$ 302.

The first frequency $\omega_{L1}$ of the first laser beam 130 and the second frequency $\omega_{L2}$ of the second laser beam 140 may be adjusted to differ by a frequency $\omega_M$ corresponding to an energy difference of two levels of the motional mode of the trapped ion and a predetermined detuning $\delta$, i.e. $|\omega_{L1}-\omega_{L2}|=\omega_M+\delta$. As mentioned in section Quantum computing, the motion of one or more trapped ions may be described by a quantum harmonic oscillator potential. Such a potential provides quantized motional modes for the quantum system including equidistant energy levels.

For example, the first frequency $\omega_{L1}$ may correspond to a transition from the state $|\downarrow\rangle|n\rangle$ 330 to a virtual energy level 321 and the second frequency $\omega_{L2}$ may correspond to a transition from a virtual energy level 321 to an energy level 350, which is detuned by the frequency $\delta$ from the state $|\downarrow|n+1\rangle$. For example, the first frequency $\omega_{L1}$ may correspond to a transition from the state $|\uparrow\rangle|n\rangle$ 340 to a virtual energy level 322 and the second frequency $\omega_{L2}$ may correspond to a transition from a virtual energy level 322 to an energy level 351, which is detuned by the frequency $\delta$ from the state $|\uparrow\rangle|n+1\rangle$.

Figure 6:
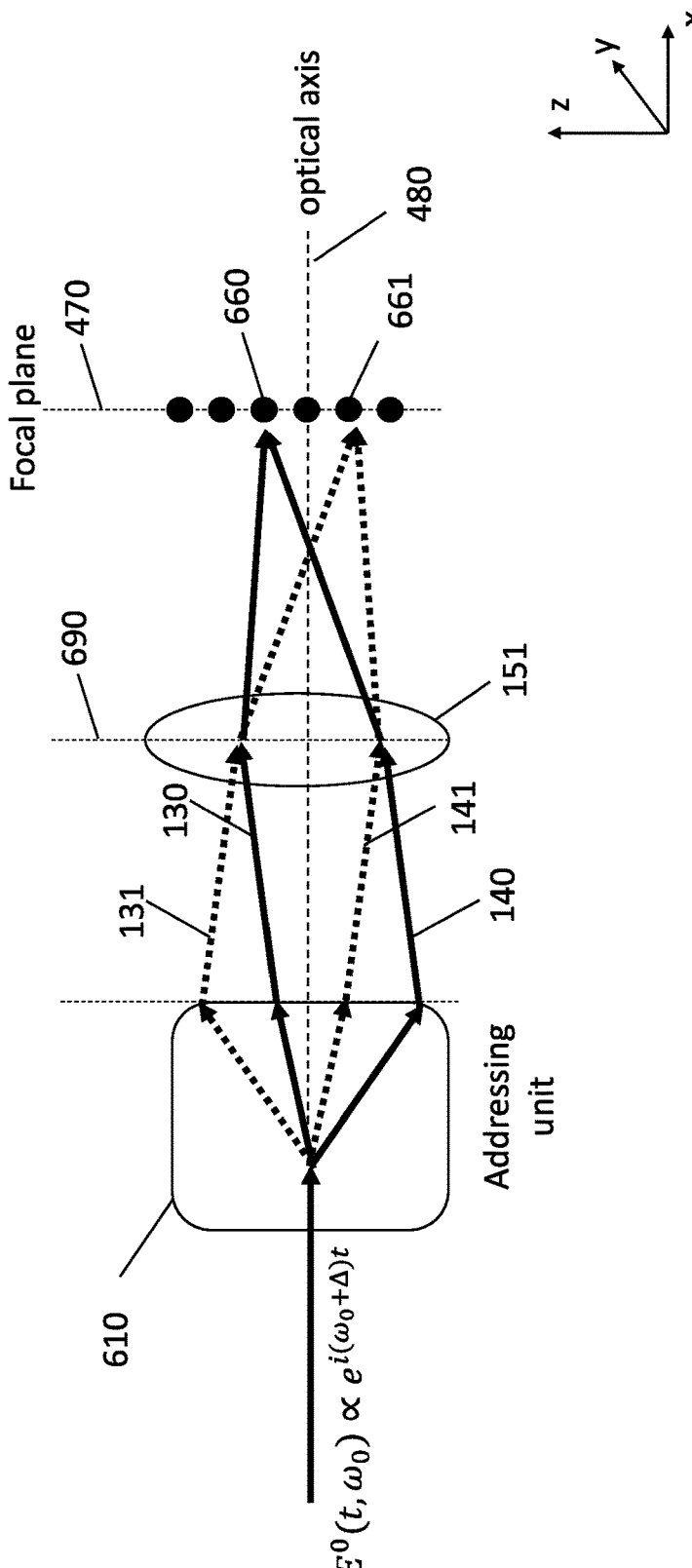
FIG. 6 is a schematic diagram illustrating the addressing of two ions with two parallel laser beams, respectively.

As already indicated above, the trapped ion may be a first trapped ion out of one or more trapped ions. As exemplarily shown in FIG. 6, a second trapped ion 661 may be located in the focal plane 470 of the objective 150. For example, the first ion 660 and the second ion 661 may be included in a plurality of ions. The first and the second ion may be located on a trap axis. The first ion and the second ion may be trapped in an ion trap as explained above in section Ion traps.

Such trap axis lies within the focal plane 470 of the objective and is thus perpendicular to the optical axis 480 of the objective 150.

The laser unit 110 as described above is further configured to emit a third laser beam 131 and a fourth laser beam 141. The third laser beam 131 has a third frequency $\omega_{L3}$ and the fourth laser beam 141 has a fourth frequency $\omega_{L4}$. The third frequency is different from the fourth frequency. For example, the third frequency may be equal to the first frequency and the fourth frequency may be equal to the second frequency. However, the present disclosure is not limited to such choice of frequencies.

The third laser beam 131 and the fourth laser beam 134 may pass through the at least one common lens 151 of the objective 150. The laser unit 110 is controlled by a controller 120 to induce a force on the second trapped ion 661, using the third laser beam 131 and the fourth laser beam 141. Analogous to the excitation of the first trapped ion 660, the third laser beam 131 and the fourth laser beam 141 generate a moving standing wave at the position of the second trapped ion 661, which induces the force on the second trapped ion 661. The addressing unit 610 may be configured to generate pairs of parallel laser beams.

The properties and/or configurations of the first and the second laser beam, as described above, may apply analogously to the third and the fourth laser beam, respectively.

A first and a second trapped ion may be spatially separated, for example, due to Coulomb interaction and/or ion trap design or the like. Thus, to address a specific ion out of a plurality of trapped ions, the propagation direction of the laser beams focused at the position of said specific ion may be adjusted by changing the inclination angle of the laser beams with respect to the optical axis 480 of the objective 150. In other words, the propagation direction of the first laser beam 130 and the second laser beam 131 before passing the at least one common lens 151 differs from a propagation direction of the third laser beam 140 and the fourth laser beam 141 before passing the at least one common lens 151 in a respective angle of incidence with respect to a principle plane 690 of objective 150.

As mentioned-above, the first laser beam 130 and the second laser beam 140 may be separated by a predetermined distance before passing the common lens 151. Analogously, the third laser beam 131 and the fourth laser beam 141 may be separated by a predetermined distance before passing the common lens 151.

Figure 7B:
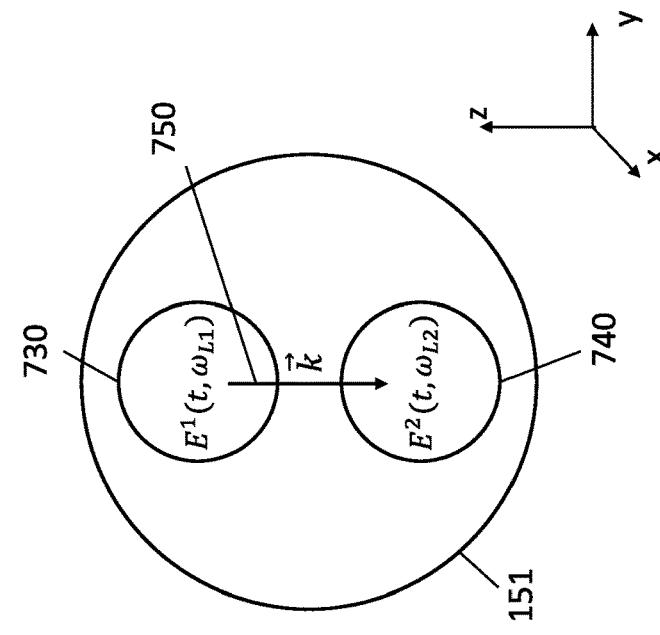
FIGS. 7A-B exemplarily illustrate the focusing of two laser beams on a single ion, the laser beams being separated by a predetermined distance in axial direction.
Figure 7A:
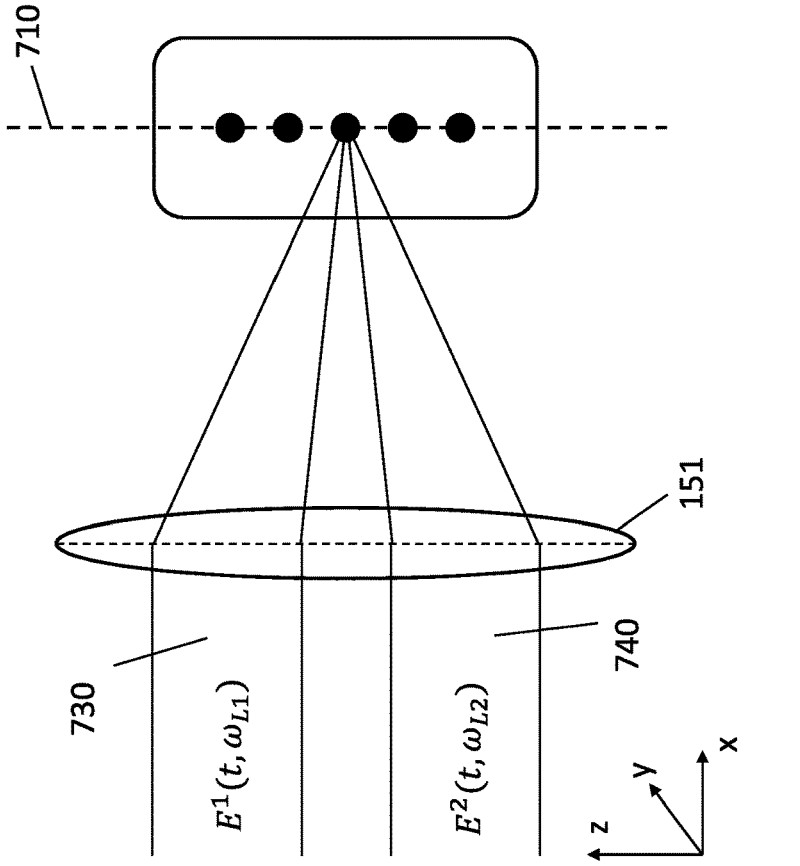

The first ion 660 and the second ion 661 may be located on a trap axis, which is perpendicular to the optical axis 480. As exemplarily illustrated in FIGS. 7A and 7B, the first laser beam 730 and the second laser beam 740 may be separated by a predetermined distance in an axial direction with respect to the trap axis 710 before passing the at least one common lens 151. FIG. 7A illustrates said separation in the axial direction. FIG. 7B provides a rotated view of the separation in the axial direction including an indication of the resulting wave vector $\vec{k}$ 750 of the first laser beam 730 and the second laser beam 740. Said exemplary wave vector $\vec{k}$ is parallel to the trap axis 710. In other words, without loss of generality, both the trap axis 710 as well as the resulting wave vector 750 are parallel to the z-axis.

Figures 8A, 8B, 8C:
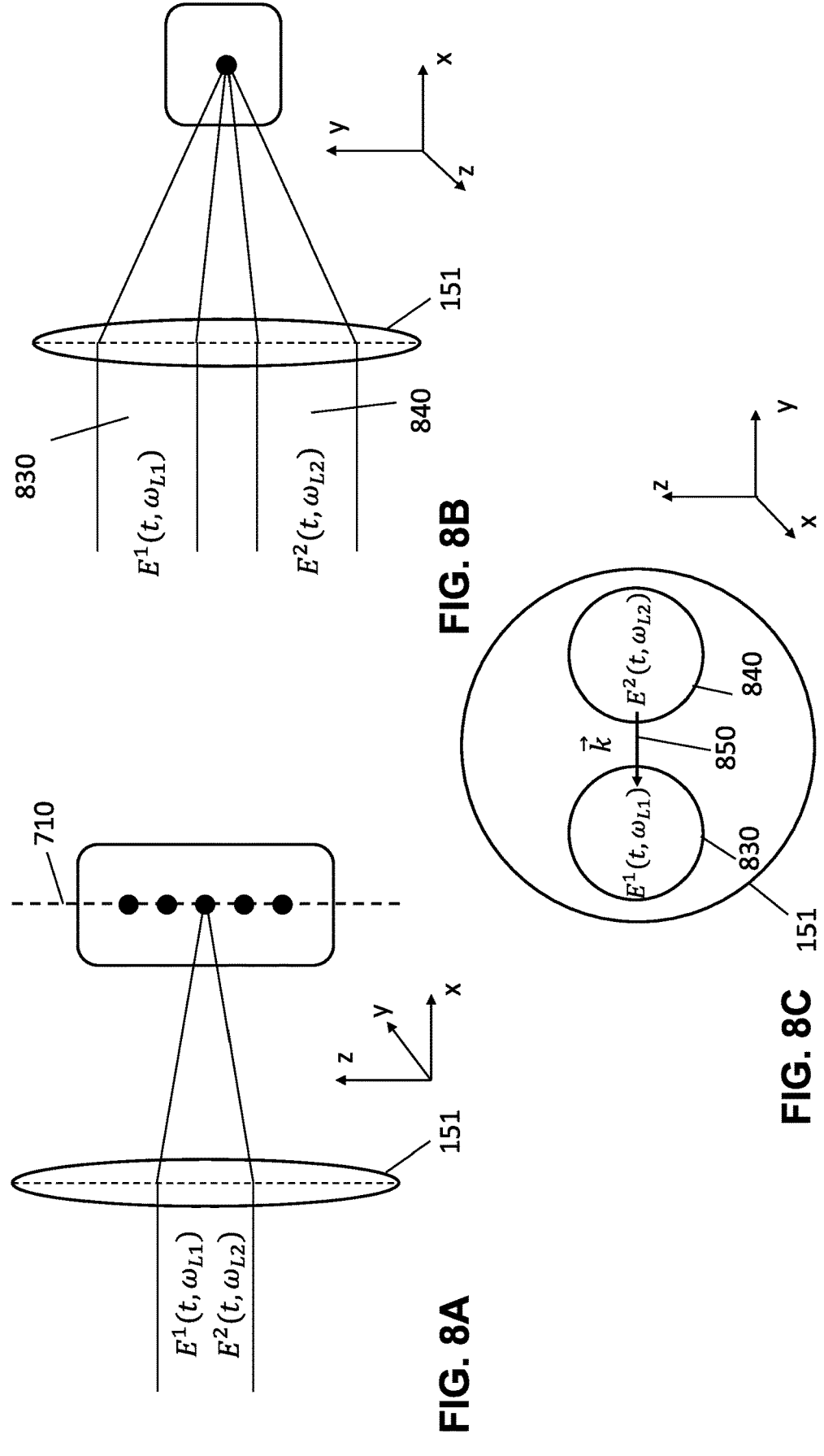
FIGS. 8A-C exemplarily illustrate the focusing of two laser beams on a single ion, the laser beams being separated by a predetermined distance in radial direction.

A further example is illustrated in FIGS. 8A to 8C, which provide three different views of a first laser beam 830 and the second laser beam 840, which may be separated by a predetermined distance in a radial direction with respect to the trap axis 710 before passing the at least one common lens 151. Analogous to FIG. 7A, the trap axis 710 in FIG. 8A points in z-direction. FIG. 8B illustrates the separation by a predetermined distance in the radial direction, which corresponds to y-direction in this exemplary implementation. FIG. 8C illustrates a cross section in the y-z-plane including the resulting wave vector $\vec{k}$ 850. In this exemplary coordinate system, the resulting wave vector $\vec{k}$ 850 is parallel to the y-axis.

A larger distance of the two laser beams in the principal plane 690 of the objective 150, which excite an ion, results in a smaller wavelength of the moving standing wave, thus increasing the induced force. In the case, when a first ion and a second ion are entangled, a larger distance may enhance the coupling of the first and the second ion and thus the speed of the quantum gate.

The force on the first tapped ion, which is induced by using the first laser beam and the second laser beam, and the force on the second tapped ion, which is induced by using the third laser beam and the fourth laser beam may be induced simultaneously. In other words, the controller 120 may be further configured to control one or more of the laser unit 110 and one or more optical components to adjust the optical path in order to induce a force on the first trapped ion 660 and the second trapped ion 661 simultaneously.

The force on the first trapped ion 660 and the force on the second trapped ion 661 may be induced by a moving interference pattern. Said interference pattern may result from a superposition of the moving standing wave generated at the position of the first trapped ion 660 and a moving standing wave generated at the position of the second trapped ion 661. Such moving interference pattern at the position of the first trapped ion 660 and at the position of the second trapped ion 661 may be generated including controlling the laser unit 110.

A controlled excitation of one or more ions is a prerequisite for the implementation of quantum gates, which may entangle two or more ions. An overview of quantum gates is provided above in the section Quantum gates.

For example, the apparatus may perform a LS-gate on the first and the second trapped ion. In such an exemplary implementation of a LS-gate, the first trapped ion 660 and the second trapped ion 661 may be describe as a quantum system. Said quantum system may include common motional modes of the ions. The common motional modes such as the center-of-mass mode or the stretch mode may be excited.

In said exemplary implementation of a LS-gate, the first frequency $\omega_{L1}$ and the second frequency $\omega_{L2}$ differ by a mode frequency $\omega_M$ of said quantum system and a predetermined detuning $\delta$, i.e. $|\omega_{L1}-\omega_{L2}|=\omega_M+\delta$. This has been explained above with reference to FIG. 3.

Moreover, third frequency $\omega_{L3}$ and the fourth frequency $\omega_{L4}$ in said exemplary implementation of a LS-gate differ by the mode frequency $\omega_M$ of said quantum system and the predetermined detuning $\delta$, i.e. $|\omega_{L3}-\omega_{L4}|=\omega_M+\delta$.

For example, the second frequency as well as the fourth frequency are chosen from the range 400 THz to 800 THz. A laser beam having a frequency within said range drives an optical transition. In this first exemplary implementation, the second frequency and the fourth frequency may be equal, i.e. $\omega_{L2}=\omega_{L4}$.

To obtain the desired frequency difference, the first frequency is given by $\omega_{L1}=\omega_{L2}+\omega_M+\delta$ and the third frequency is given by $\omega_{L3}=\omega_{L4}+\omega_M+\delta$. In this exemplary implementation of a LS-gate, the first frequency and the third frequency are equal, i.e. $\omega_{L1}=\omega_{L3}$.

The frequency of a motional transition cu m is a property of the quantum system including one or more trapped ions. It may depend, for example, on one or more of the type of the ion(s), the number of ions, the trap design, or the like. The frequency of a motional transition $\omega_M$ lies typically in a frequency range of 300 kHz to 5000 kHz. The detuning may be chosen as explained above in section Quantum gates.

One exemplary implementation may include a moving standing wave interacting for 50 µs with two ions in axial direction, implemented by two crossed laser beams that may have a frequency of $\omega_{L1}=\omega_{L2}+\omega_M+\delta$ and $\omega_{L2}$, where the axial COM frequency may be $\omega_M=(2\pi)1000$ kHz and the detuning may be chosen to be $\delta=(2\pi)20$ kHz. The required laser power depends on the specific coupling that may be determined by one or more of the following factors, such as e.g. the laser beam waist, the laser wavelength, the ion mass, the resulting wave vector of the moving standing wave or the like. For the implementation of an exemplary fully entangling LS-gate, the laser power is tuned such that the resulting coupling strength corresponds to half of the detuning, which corresponds to 10 kHz in this exemplary implementation.

Performing such an excitation of the first ion and of the second ion simultaneously may facilitate an entanglement of said two ions by such a LS-gate operation, as explained above in section Quantum gates.

For example, the apparatus may perform a MS-gate on the first and the second trapped ion. A scheme illustrating the energy levels for a single ion out of the first and the second trapped ion is given in FIG. 2. In such an exemplary implementation of a MS-gate, the first frequency $\omega_{L1}$ is based on a transition from a first state 240 to a virtual state 220 of the first ion 660. In other words, the first frequency corresponds to an energy difference $\hbar\omega_{L1}$ of the virtual state 220 and the first state 240 of the first ion. The first state of the ion may be, for example, the state $|\uparrow\rangle|n\rangle$. However, the present disclosure is not limited to said exemplary state, any other state of the ion may be used, e.g. $|\downarrow\rangle|n\rangle$, $|\uparrow\rangle|n+1\rangle$, $|\downarrow\rangle|n-1\rangle$, or the like.

The second laser beam 140 in said exemplary implementation of a MS-gate is a multi-chromatic laser beam. For example, the second laser beam 140 has the second frequency $$\omega_{L2}^r$$

and a fifth frequency $$\omega_{L2}^b.$$

In said exemplary implementation of a MS-gate, the second frequency is based on a red sideband 231 transition from the virtual state 220 to a second state 230 of the first ion 660 and a first predetermined detuning $\delta_1$. If the first state of the ion is the state $|\uparrow\rangle|n\rangle$, the second state of the ion is the state $|\downarrow\rangle|n\rangle$. However, the present disclosure is not limited to such an exemplary set of states. In general, the second state of the ion has the same motional state (e.g. $|n\rangle$) and a different internal qubit state as the first state of the ion.

The frequency corresponding to the energy difference of the internal qubit states $|\uparrow\rangle$ and $|\downarrow\rangle$ having a same motional state is labeled as $\omega_0$.

In other words, the second frequency corresponds a transition between the virtual state 220 and the energy level 251, i.e.

$$\omega_{L2}^r = \omega_{L1} + \omega_0 - \omega_M - \delta.$$

The first predetermined detuning $\delta$ is chosen as explained in the section Quantum gates.

In said exemplary implementation of a MS-gate, the fifth frequency is based on a blue sideband transition 232 from the virtual state 220 to the second state 230 of the first ion 660 and a second predetermined detuning $\delta_2$.

In other words, the fifth frequency corresponds a transition between the virtual state 220 and the energy level 250, i.e.

$$\omega_{L2}^b = \omega_{L1} + \omega_0 + \omega_M + \delta.$$

In this exemplary implementation of a MS-gate, the second predetermined detuning has the same magnitude as the first predetermined detuning, but a different sign. However, the present disclosure is not limited to such choice of the second predetermined detuning. For example, the second predetermined detuning may be equal to the first predetermined detuning. For example, the second predetermined detuning may be different from the first predetermined detuning.

Analogous to the first laser beam 130, the frequency of the third laser beam 131 (i.e. the third frequency $\omega_{L3}$) in the exemplary implementation of a MS-gate is based on a transition from a first state 240 to a virtual state 220 of the second ion 661. In other words, the third frequency corresponds to an energy difference $\hbar\omega_{L3}$ of the virtual state 220 and the first state 240 of the second ion 661. Furthermore, the frequency of the third laser beam $\omega_{L3}$ may be equal to the frequency of the first laser beam $\omega_{L1}$.

The fourth laser beam 141 in said exemplary implementation of a MS-gate is a multi-chromatic laser beam. For example, the fourth laser beam 141 has the fourth frequency $$\omega_{L4}^r$$

and a sixth frequency $$\omega_{L4}^b.$$

In said exemplary implementation of a MS-gate, the fourth frequency is based on a red sideband 231 transition from the virtual state 220 to a second state 230 of the second ion 661 and a third predetermined detuning. In other words, the fourth frequency corresponds a transition between the virtual state 220 and the energy level 251, e.g.

$$\omega_{L4}^r = \omega_{L3} + \omega_0 - \omega_M - \delta.$$

The third predetermined detuning $\delta_3$ is chosen as explained in the section Quantum gates.

In said exemplary implementation of a MS-gate, the sixth frequency is based on a blue sideband transition 232 from the virtual state 220 to the second state of the second ion 230 and a second predetermined detuning. In other words, the sixth frequency corresponds a transition between the virtual state 220 and the energy level 250, e.g.

$$\omega_{L4}^b = \omega_{L3} + \omega_0 + \omega_M + \delta.$$

In this exemplary implementation of a MS-gate, the fourth predetermined detuning $\delta_4$ has the same magnitude as the third predetermined detuning, but a different sign.

However, the present disclosure is no limited to such choice of the fourth predetermined detuning. For example, the fourth predetermined detuning may be equal to the third predetermined detuning. For example, the fourth predetermined detuning may be different from the third predetermined detuning. Moreover, the third predetermined detuning may be equal to the first predetermined detuning and the fourth predetermined detuning may be equal to the second predetermined detuning.

The frequencies $$\omega_{L4}^r$$

and $$\omega_{L4}^b$$

of the fourth laser beam may be equal to the respective frequencies $$\omega_{L2}^b$$

and $$\omega_{L2}^r$$

of the second laser beam.

One exemplary implementation may include two laser beams interacting for a duration of 50 μs with two ions in axial direction, implemented by two crossed or copropagating laser beams. The first laser beam has a frequency $\omega_{L1}$ and the second laser beam comprises two frequencies $$\omega_{L2}^b = \omega_{L1} + \omega_0 + \omega_M + \delta$$

and $$\omega_{L2}^r = \omega_{L1} + \omega_0 - \omega_M - \delta,$$

where the frequency $\omega_0$ corresponds to the energy difference of the two qubit states, the axial COM mode frequency may be $\omega_M = (2\pi)1000$ kHz and the detuning may be chosen to be $\delta = (2\pi)20$ kHz. The required laser power depends on the specific coupling, that may be determined by several factors, such as e.g. the laser beam waist, the laser wavelength, the ion mass, the resulting wave vector or the like. For the implementation of an exemplary fully entangling MS-gate, the laser power is tuned such that the resulting coupling strength corresponds to half of the detuning, which corresponds to 10 kHz in this exemplary implementation.

Performing such an excitation of the first ion and of the second ion simultaneously may facilitate an entanglement of said two ions by such a MS-gate operation, as explained above in section Quantum gates.

It is noted that although embodiments and examples of the present disclosure were provided in terms of an apparatus above, the corresponding method providing the functionality described by the apparatus are also provided.

Figure 10:
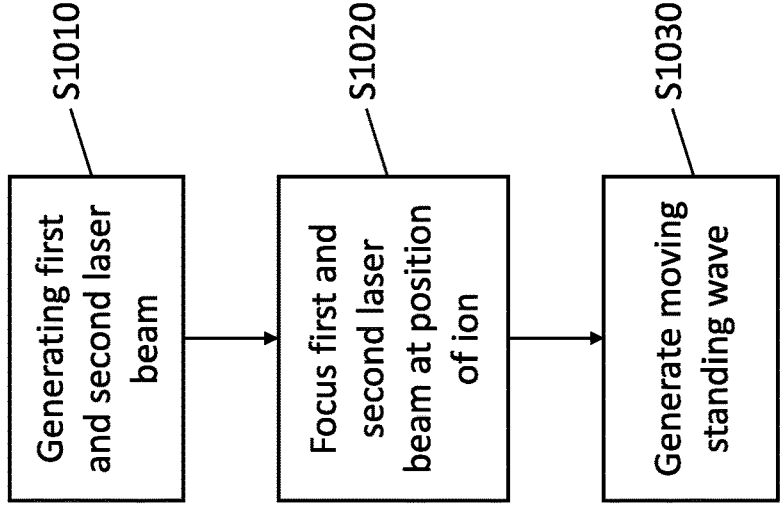
FIG. 10 is an exemplary flowchart for exciting a trapped ion.

As shown in FIG. 10, the method comprises the steps of:
generating S1010 a first laser beam and a second laser beam, the first laser beam having a first frequency and the second laser beam having a second frequency, the first frequency being different from the second;
the first laser beam and the second laser beam being focused S1020 at a position of the trapped ion, wherein the first laser beam and the second laser beam pass through at least one common lens within an objective; and
generating S1030 a moving standing wave at the position of the trapped ion, which induces a force on the trapped ion, using the first laser beam and the second laser beam.

Implementations in Software and Hardware

It is noted that any of the steps of the method described above may be included as code instructions in a program, which may be executed by one or more processors.

Figure 9:
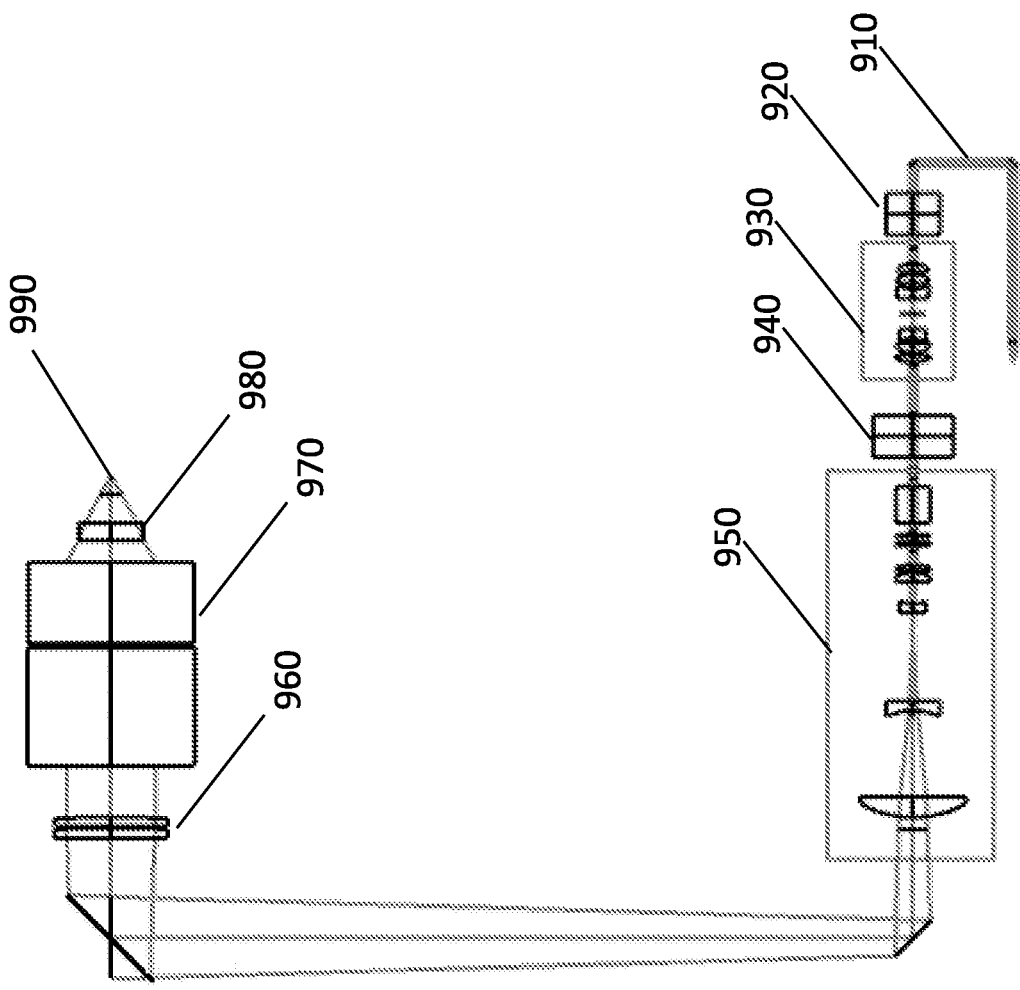
FIG. 9 provides a scheme of an exemplary optical path of the laser beams.

FIG. 9 illustrates an exemplary optical path of the two or more laser beams 910 including the objective 970. The exemplary setup includes a first AOM 920, a second AOM 940, a 4F-relay optics 930, an expansion optics 950 and collimation lenses 960. Said optical components provide examples for the static as well as for the dynamically controlled optical components mentioned above. Moreover, FIG. 9 illustrates the vacuum window 980, which provides optical access to the ion trap, and the focusing of the laser beams on the trap axis 990.

Figure 11:
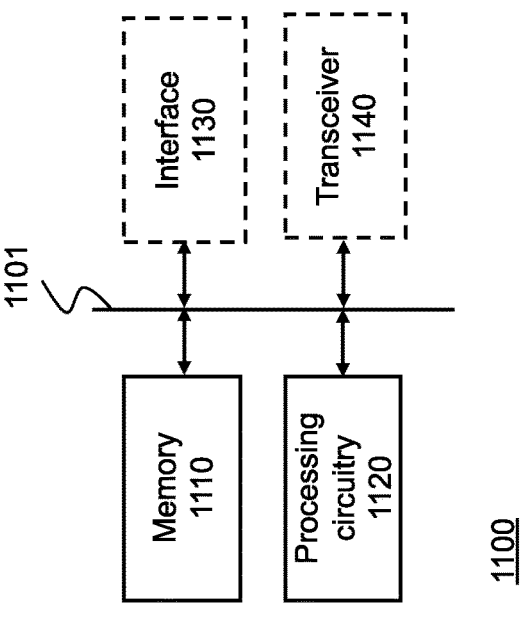
FIG. 11 is a block diagram illustrating an exemplary controller included in the apparatus for exciting a trapped ion.

FIG. 11 shows an exemplary controller 1100, which is included in the apparatus described in the present disclosure. For example, the controller controls laser unit and may additionally control further components included in the apparatus for exciting an ion. Such a device may include memory 1110, processing circuitry 1120, and possibly a transceiver 1140 and a user interface 1130. The device may be, for instance a (part of) a computing device or any other suitable device.

The memory 1110 may store the program, which may be executed by the processing circuitry 1120 to perform steps of any of the above-mentioned methods. The processing circuitry may comprise one or more processors and/or other dedicated or programmable hardware. The transceiver 1140 may be configured to receive and/or transmit (controlling) signals. The device 1100 may further include a user interface 1130 for displaying messages or status of the device, or the like and/or for receiving a user's input. A bus 1101 interconnects the memory, the processing circuitry, the transceiver, and the user interface.

It is noted that the controller may be implemented by any hardware means, apart from using a general purpose processor, it can be implemented as a micro-controller, by means of a programmable hardware such as field programmable gate array (FPGA) or as a specialized hardware such as an application-specific integrated circuit (ASIC). Any combination of the above-mentioned hardware and possibly a software may be used.

The embodiments and exemplary implementations mentioned above show some non-limiting examples. It is understood that various modifications may be made without departing from the claimed subject matter. For example, modifications may be made to adapt the examples to new systems and scenarios without departing from the central concept described herein.

Summarizing, some embodiments in the present disclosure relate to an apparatus and methods to excite a trapped ion. A first laser beam and a second laser beam pass through at least one common lens of an objective. The two laser beams are focused by said objective at the position of the trapped ion. A moving standing wave is generated at the position of the trapped ion, which induces a force on the trapped ion. Two ions may be entangled by generating such moving standing wave at the respective positions of both of said ions.

The invention claimed is:

1. An apparatus for exciting a trapped ion comprising:
a laser unit configured to emit a first laser beam and a second laser beam, the first laser beam having a first frequency and the second laser beam having a second frequency, wherein the first frequency is different from the second frequency;
an objective configured to focus the first laser beam and the second laser beam at a position of a trapped ion, wherein the first laser beam and the second laser beam pass through at least one common lens within the objective; and
a controller configured to control said laser unit to generate a moving standing wave at the position of the trapped ion, which induces a force on the trapped ion, using the first laser beam and the second laser beam.

2. The apparatus according to claim 1, wherein the objective is further configured to direct the first laser beam and the second laser beam with a same propagation direction to the at least one common lens.

3. The apparatus according to claim 1, wherein the controller is further configured to control one or more optical components to direct the first laser beam and the second laser beam to obtain a same propagation direction of the first laser beam and the second laser beam before the passing of the at least one common lens.

4. The apparatus according to claim 1, wherein the first laser beam and the second laser beam are separated by a predetermined distance before the passing of the at least one common lens.

5. The apparatus according to claim 1, wherein the first frequency and the second frequency differ by a frequency corresponding to a motional mode of the trapped ion and a predetermined detuning.

6. The apparatus according to claim 1, wherein the trapped ion is a first trapped ion, a second trapped ion is located in a focal plane of the objective, and the first trapped ion and the second trapped ion are located on a trap axis;
the laser unit is further configured to emit a third laser beam and a fourth laser beam, the third laser beam having a third frequency and the fourth laser beam having a fourth frequency, the third frequency is different from the fourth frequency;

wherein the third laser beam and the fourth laser beam pass through the at least one common lens within the objective; and the controller is further configured to control said laser unit to induce a force on the second trapped ion using the third laser beam and the fourth laser beam.

7. The apparatus according to the claim 6, wherein the propagation direction of the first laser beam and the second laser beam before passing the at least one common lens differs from a propagation direction of the third laser beam and the fourth laser beam before passing the at least one common lens in a respective angle of incidence with respect to a principle plane of objective.

8. The apparatus according to claim 6, wherein:

the first laser beam and the second laser beam are separated by a predetermined distance in an axial direction with respect to the trap axis before passing the at least one common lens for an axial excitation of the first trapped ion, or the first laser beam and the second laser beam are separated by a predetermined distance in a radial direction with respect to the trap axis before passing the at least one common lens for a radial excitation of the first trapped ion.

9. The apparatus according to claim 6, wherein the controller is further configured to control said laser unit to simultaneously induce a force on the first trapped ion using the first laser beam and the second laser beam and a force on the second trapped ion using the third laser beam and the fourth laser beam.

10. The apparatus according to claim 9, wherein the controller is further configured to control said laser unit to generate a moving interference pattern at the position of the first trapped ion and at the position of the second trapped ion.

11. The apparatus according to claim 9, wherein:

the first trapped ion and the second trapped ion are included in a quantum system, the first frequency and the second frequency differ by a mode frequency of said quantum system and a predetermined detuning, and the third frequency and the fourth frequency differ by the mode frequency of said quantum system and the predetermined detuning.

12. The apparatus according to claim 9, wherein:

the first frequency is based on a transition from a first state to a virtual state of the first ion, the second laser beam having the second frequency and a fifth frequency, the second frequency is based on a red sideband transition from the virtual state to a second state of the first ion and a first predetermined detuning, the fifth frequency is based on a blue sideband transition from the virtual state to the second state of the first ion and a second predetermined detuning, the third frequency is based on a transition from a first state to a virtual state of the second ion, the fourth laser beam having the fourth frequency and a sixth frequency, the fourth frequency is based on a red sideband transition from a virtual state to a second state of the second ion and a third predetermined detuning, and the sixth frequency is based on a blue sideband transition from the virtual state to the second state of the second ion and a fourth predetermined detuning.

13. A method for exciting a trapped ion, comprising:

generating a first laser beam and a second laser beam, the first laser beam having a first frequency and the second laser beam having a second frequency, the first frequency being different from the second frequency, the first laser beam and the second laser beam being focused at a position of a trapped ion, wherein the first laser beam and the second laser beam pass through at least one common lens within an objective; and generating a moving standing wave at a position of the trapped ion, which induces a force on the trapped ion, using the first laser beam and the second laser beam.

* * * * *